United States Patent

Stone

[15] 3,699,463

[45] Oct. 17, 1972

[54] ERROR REDUCTION IN COMMUNICATION SYSTEMS

[72] Inventor: Julian Stone, Rumson, N.J.

[73] Assignee: Bell Telephone Laboratories Incorporated, Murray Hill, N.J.

[22] Filed: Nov. 30, 1970

[21] Appl. No.: 93,769

[52] U.S. Cl. ..................329/145, 325/320, 325/347, 325/474, 329/104, 329/135

[51] Int. Cl. ..............................................H03d 1/20

[58] Field of Search......................329/104, 131–136, 329/145, 146; 325/320, 347, 474–477; 178/66

[56] References Cited

UNITED STATES PATENTS

| | | | |
|---|---|---|---|
| 3,176,231 | 3/1965 | Vallese et al. | 329/132 X |
| 2,609,493 | 9/1952 | Wilmotte | 329/131 X |
| 2,450,818 | 10/1948 | Vermillion | 325/476 |
| 3,064,197 | 11/1962 | Ek | 325/474 |
| 3,084,329 | 4/1963 | Clay | 325/476 X |

*Primary Examiner*—Alfred L. Brody
*Attorney*—R. J. Guenther and Arthur J. Torsiglieri

[57] ABSTRACT

The output from a phase detector is a function of both the amplitude and phase of the input signals. Error, due to spurious amplitude modulation of the angular modulated carrier signal, is minimized by dividing the phase detector output signal by a reference signal whose instantaneous amplitude is proportional to the amplitudes of the phase detector input signals. A phase modulated, optical communication system is described. The principles of the invention are also applicable to amplitude and frequency modulated signal systems.

7 Claims, 6 Drawing Figures

INVENTOR
J. STONE
BY

ATTORNEY

ERROR REDUCTION IN COMMUNICATION SYSTEMS

This invention relates to error reduction in communication systems.

BACKGROUND OF THE INVENTION

It is the common practice in radio-frequency, phase-sensitive detection systems to hard-limit, or clip the amplitude of the phase-modulated signal prior to detection. This is done because the output from a phase detector is a function of both the relative phase and the amplitude of the input signal. Hence, hard limiting eliminates noise in the output of the phase detector due to amplitude fluctuations of the input signal, and, more generally, normalizes the output from the detector so that the output is directly related solely to phase, and is independent of signal amplitude.

Obviously, it would be equally desirable to enjoy these advantages in optical frequency phase detection devices. However, there are no known optical devices capable of preserving phase information intact while the amplitude of the output signal is maintained at a level that is independent of the amplitude of the input signal.

It is, accordingly, an object of the present invention to effect the equivalent of hard-limiting at optical frequencies.

More generally, however, it is the broad object of the present invention to minimize distortion in communication systems resulting from spurious variations in the amplitude of the input signal to the modulation detector. As will be explained in greater detail hereinbelow, the principles of the present invention are equally applicable to amplitude modulated signals as well as to angular modulated signals.

SUMMARY OF THE INVENTION

In accordance with the present invention, error reduction in communication systems is realized by generating a reference signal whose instantaneous amplitude is a function of the amplitude of the carrier input signal, and then dividing the demodulator output by this reference signal. Since the demodulator output is also related to the amplitude of the input carrier signal, dividing by the reference signal normalizes the demodulator output signal.

In an angular (i.e., frequency or phase) modulated communication system, signal detection (demodulation) involves recovery of the information impressed upon the angular velocity of the signal carrier. In one type of detection system, this is done by comparing the instantaneous phase of the modulated carrier signal with that of an unmodulated, phase-coherent carrier signal. So long as the amplitudes of these two signals vary in the same proportion, the normalizing reference signal can be obtained from either of these two signals. Thus, in accordance with a first embodiment of the present invention, both the angular modulated signal, and an unmodulated, phase-coherent signal are transmitted between transmitter and receiver over a common wavepath. Spurious amplitude variations in the received signals are than eliminated by dividing the demodulator output signal by a reference signal obtained by amplitude detecting either one of the two received signals.

In other types of angular modulated systems, (such as the so-called frequency-shift-keyed type of modulation,) only the modulated carrier is transmitted between transmitter and receiver. Detection in such a system includes separating the different frequency signals by means of filters, and then amplitude detecting the respective signals. The presence or absence of a signal is then indicated by threshold circuits which respond to signals greater then some specified level. To minimize errors due, for example, to signal fading, which tends to lower the detected signal level below the threshold level, the output signal from the detectors in this second embodiment of the invention, are divided by a normalizing reference signal, obtained by detecting the modulated carrier before any filtering, prior to their being applied to their respective threshold circuits.

The principles of the present invention are also applicable to amplitude modulated communication systems. Thus, in a third illustrative embodiment of the invention, the output from an amplitude detector is divided by a reference signal derived by amplitude detecting the carrier signal, and filtering out all modulation components, leaving a signal that is a function solely of the carrier amplitude.

In some types of angular modulation detectors, the amplitude of the modulation detector output signal is not linearly related to amplitude variations of the detector input signal. In such a case, the reference signal is shaped, as a function of the input signal amplitude, to have the same amplitude response as the modulation detector.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
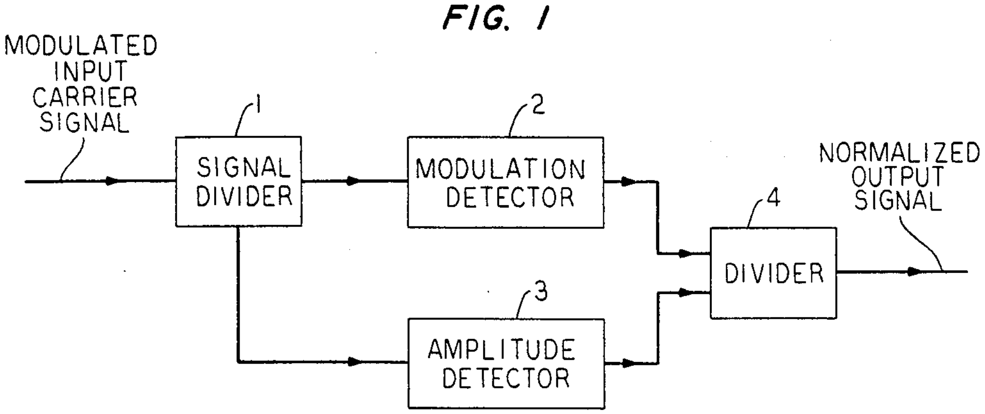
FIG. 1 shows, in block diagram, a signal detector in accordance with the present invention.

Referring to the drawings, FIG. 1 shows, in block diagram, a signal detector, in accordance with the present invention, comprising a signal divider 1, for dividing the modulated input carrier signal into two like components; a modulation detector 2, for recovering the modulation impressed upon the carrier signal; an amplitude detector 3, for deriving a reference signal that is proportional to the instantaneous amplitude of the carrier signal; and a divider 4, for dividing the modulation detector output signal by the reference signal to produce a normalized output signal whose amplitude is substantially independent of spurious variations in the amplitude of the carrier signal.

In an angular modulated communication system, the information signal is impressed upon the angular velocity of the carrier signal. Ideally, the amplitude of the carrier signal remains constant. However, the detector, which is designed to respond primarily to the angular modulation, also responds to amplitude changes in the carrier signal. Accordingly, spurious carrier signal amplitude variations appear as error components at the output of the modulation detector.

In accordance with the present invention, the amplitude of the carrier signal is continuously monitored by amplitude detector 3, which produces a reference output signal whose instantaneous amplitude varies as a function of the amplitude of the carrier signal. The reference signal, thus derived, is used to divide the modulation detector output signal, producing, thereby, a normalized output signal that is substantially independent of changes in the amplitude of the carrier signal.

It will be recognized that the explanation given hereinabove is, of necessity, rather general. Obviously, the details of any particular error correcting circuit will be uniquely a function of the particular modulation and detection systems employed. To illustrate, these principles are now applied to a number of different modulation systems.

Phase Modulation

Figure 2:
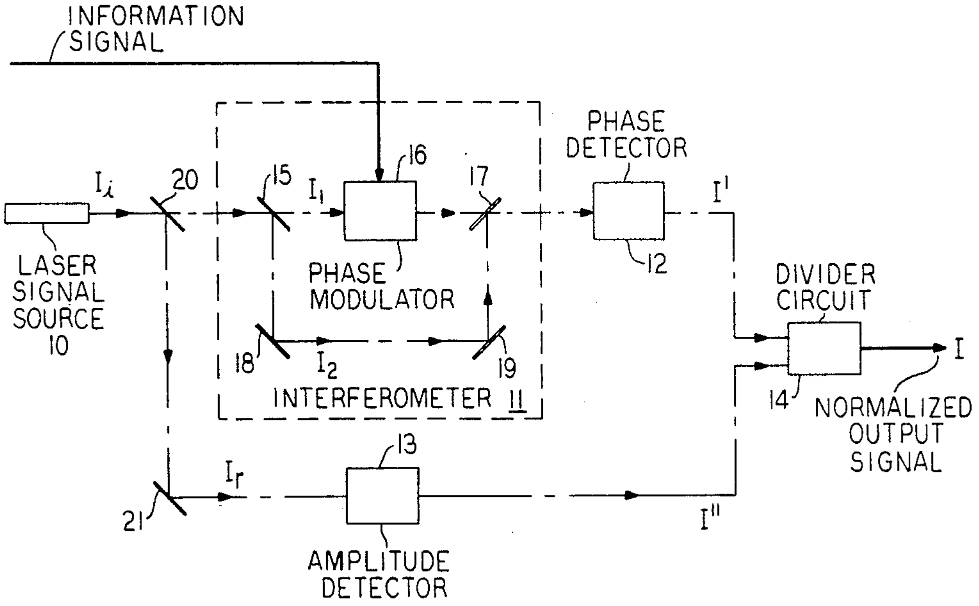
FIGS. 2 and 3, more specifically, show a normalized optical, phase modulated communication system.

FIG. 2 shows an optical, phase modulated system, normalized in accordance with the present invention, comprising a laser signal source 10, an interferometer 11; a phase detector 12; an amplitude detector 13; and a divider circuit 14. Interferometer 11 includes a first hybrid junction 15, (i.e., a partially reflective mirror) for dividing the input optical beam derived from signal source 10 into two, phase-coherent beam components $I_1$ and $I_2$. One component, $I_1$, is directed through a phase modulator 16 comprising, for example, an electro- or magneto-optic material whose refractive index is varied in response to an information signal applied thereto. The output from modulator 16 is directed onto a second, hybrid junction 17, along with the other, unmodulated beam component, $I_2$, which is directed thereto by means of mirrors 18 and 19.

The combined output from interferometer 11, including the phase modulated optical signal $I_1$ and the unmodulated phase coherent optical signal $I_2$, are directed onto phase detector 12. The latter, which can be any of the known photo-sensitive diodes or photomultiplier devices, produces an output signal I' which is given by $$I' = I_1 + I_2 + 2\sqrt{I_1 I_2}\cos\phi \quad (1)$$

where $\phi$ is the instantaneous phase difference between signals $I_1$ and $I_2$.

Since $I_1$ and $I_2$ are both proportional to $I_i$, equation (1) can be rewritten as $$I' = I_i\left[(\alpha_1+\alpha_2) + 2\sqrt{\alpha_1\alpha_2}\cos\phi\right], \quad (2)$$

where $\alpha_1$ and $\alpha_2$ are constants such that $$I_1 = \alpha_1 I_i \quad (3)$$

and $$I_2 = \alpha_2 I_i. \quad (4)$$

As is apparent, the output I' from detector 12 varies both as a function of the amplitude $I_i$ of the laser carrier signal and as a function of the phase modulation $\phi$ produced by the information signal. Since there is no way to separate the two effects at the phase detector output, any variation in the intensity of the input signal appears as an error in the output.

In accordance with the present invention, however, any ambiguity introduced by variations in the amplitude of the optical input signal is eliminated by dividing the phase detector output I' by a reference signal I'' whose instantaneous amplitude is also proportional to $I_i$. The reference signal is obtained by amplitude detecting a sampled portion of the input signal $I_i$. Thus, as shown in FIG. 2, a hybrid junction 20, located between laser 10 and interferometer 11 extracts a small portion $I_r$ or beam $I_i$. The sampled portion is then coupled by means of mirror 21 onto amplitude detector 13. The output I'' therefrom, given by $$I'' = \alpha_3 I_i, \quad (5)$$

where $\alpha_3$ is a constant, is coupled, in turn, along with the phase detector output signal I' to divider 14. Since both signals I' and I'' are proportional to $I_i$, dividing I' by I'' produces an output signal $$I = \left(\frac{\alpha_1\alpha_2}{\alpha_3}\right) + \sqrt{\frac{\alpha_1\alpha_2}{\alpha_3}}\cos\phi, \quad (6)$$

which varies solely as a function of the phase modulation $\phi$. (Prepackaged divider circuits are commercially available from Hybrid Systems Corp. of Burlington, Massachusetts, and from Analog Devices of Cambridge, Massachusetts.)

Figure 3:
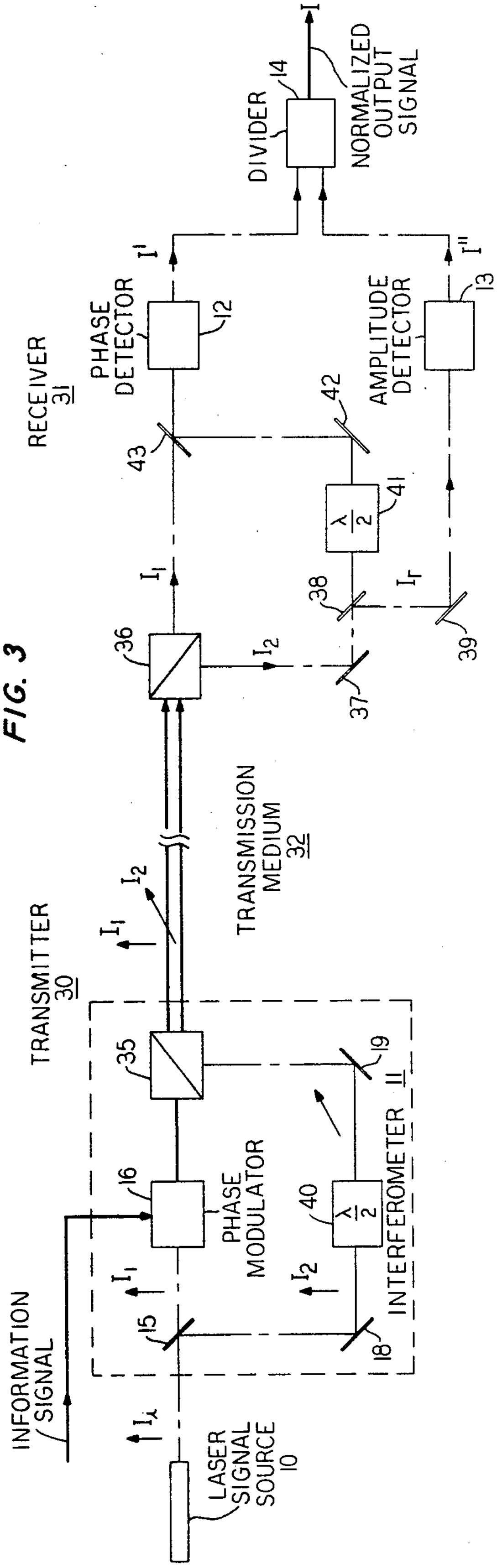

The arrangement of FIG. 2 is suitable for use where the signal source and the phase detector are both situated at the same location, in which case the reference signal $I_r$ can be conveniently obtained from the laser signal $I_i$. In a typical communication system, however, this is not the situation. Specifically, the signal source and phase modulator are located at the transmitter, while the phase detector is located some distance away at the receiver. Using the same identification numerals to identify corresponding components, FIG. 3 shows an alternate embodiment of the invention wherein laser signal source 10 and interferometer 11 are part of a transmitter 30, whereas phase detector 12, amplitude detector 13 and divider 14 are part of a receiver 31. Being separated in this manner, the transmitter and receiver are connected together by means of a transmission medium 32.

As indicated above, to normalize the output signal, the output from phase detector 12 is divided by a signal whose instantaneous amplitude varies as a function of the input signals to detector 12. In the arrangement of FIG. 3, however, the interferometer is not at at the receiver location and, hence, the reference signal is not conveniently obtained at the input to interferometer 11. An alternate arrangement is to derive the reference signal at the receiver from either the phase modulated beam component $I_1$ or the phase-coherent, unmodulated beam component $I_2$. This can only be done, however, if both components are directly proportional to $I_i$, as required by equations (3) and (4) One way to insure this proportionality is to combine these two beam components at the transmitter, and to transmit both of them along the same transmission medium, thereby insuring that they both experience identical amplitude and phase variations. In addition, they must be multiplexed in such a manner that they do not interact with each other and in a manner to permit their easy separation at the receiver. All of these requirements are satisfied, in accordance with the second embodiment of the invention, by means of a polarization multiplexing arrangement wherein the two beam components are transmitted along common transmission medium 32 with orthogonal polarization. Thus, in interferometer 11 in FIG. 3, a half-wave plate 40 is included in one of the branches to rotate the polarization of beam component $I_2$ 90° relative to the direction of polarization of component $I_1$. Following modulation, the two orthogonally-polarized beams are recombined for propagation along the common transmission medium 32 by means of a nicol prism 35, or other polarization selective means.

At the receiver, the orthogonally-polarized beams are separated by a second nicol prism 36. The deflected beam $I_2$ is redirected by a mirror 37 to a second half-wave plate 41 wherein it is rotated another ninety degrees so that it, and the beam $I_1$ are once again polarized in the same direction. The two similarly-polarized beams are then recombined by means of mirror 42, and hybrid junction 43, and projected into phase detector 12.

The reference signal $I_r$ is obtained by means of a hybrid junction 38 located in the $I_2$ beam path between mirror 37 and half-wave plate 41. Alternatively, the reference signal can be extracted from the $I_1$ beam path since both beams are proportional to $I_i$.

Frequency-Shift-Keyed Modulation

In a frequency-shift-keyed (FSK) modulation system, the encoded information signal modulates the frequency of the carrier signal such that the transmitted signal comprises a train of equal amplitude carrier pulses, each of which has one of a plurality of different frequencies. At the receiver, a frequency separating filter separates the carrier pulses according to frequency, and then separately detects them. Thus, as shown in the binary FSK system illustrated in FIG. 4, one type of FSK receiver includes a frequency separating filter 50 for separating the carrier pulses according to their frequency $f_1$ or $f_2$, and then separately detects them by means of amplitude detectors 51 and 52. In a distortionless system, the detector outputs could be used directly to reconstruct the information signal. However, recognizing the possibility that the signal in any particular time slot may include a small, spurious component at the wrong frequency, threshold circuits 53 and 54 are typically included after the detectors. Set at some arbitrary level, $v$, the threshold circuits only respond to signals above this level, the assumption being that all signals below the threshold level are spurious signals. Advantageously, the threshold level is set high, to provide the greatest discrimination. However, if the signal fades during transmission the detector output may not be sufficient to operate the threshold circuit, resulting in the loss of signal information.

In accordance with the present invention, the level of the detector output signals is normalized by sampling and amplitude detecting the input signal to the frequency separating filter. The reference signal thus produced is used to divide the signals coupled to the threshold circuits, thereby, normalizing their amplitudes in the face of signal fading.

Figure 4:
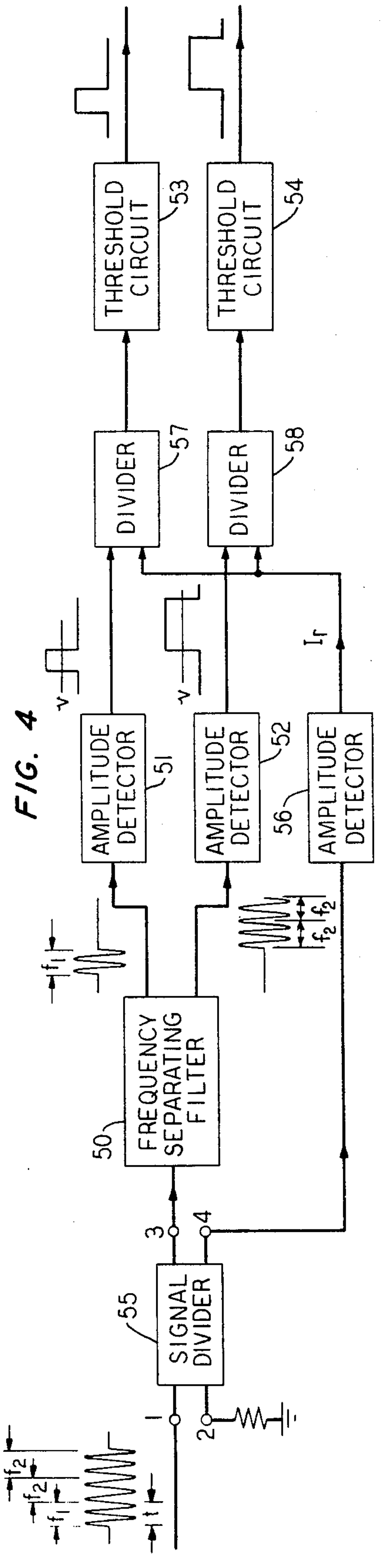
FIG. 4 shows the invention as applied to a frequency-shift-keyed modulation detector.

Thus, in FIG. 4, a signal divider 55, such as a hybrid coupler, is located at the input to frequency separating filter 50. A component of the input signal is coupled, thereby, to an amplitude detector 56, whose output is, in turn, coupled to signal dividers 57 and 58, located, respectively, between detector 51 and threshold circuit 53, and detector 52 and threshold circuit 54.

In operation, the input signal, illustrated by the three pulses $f_1f_2f_2$, is coupled into port 1 of signal divider 55. One signal component is coupled from port 3 of divider 55 to filter 50. The latter, which can be a channel dropping filter of the type disclosed by A. G. Fox in U. S. Pat. No. 2,531,419, separates the carrier pulses according to frequency. As illustrated in FIG. 4, the $f_1$ frequency pulse is coupled to amplitude detector 51, while the two $f_2$ frequency pulses are coupled to amplitude detector 52.

Following detection, the baseband pulses are coupled by means of dividers 57 and 58 to threshold circuits 53 and 54.

A second signal component is coupled from port 4 of divider 55 to amplitude detector 56 whose output, $I_r$, is also coupled to dividers 57 and 58.

In the absence of fading, the signal amplitudes derived from detectors 51 and 52, and reference detector 56 are such that the normalized baseband information pulses are greater than the threshold level necessary to operate the threshold circuits. If, however, the level of the carrier signal decreases, any tendency for a corresponding reduction in the level of the baseband signals below the threshold level $v$ is countered by a proportionate reduction in the level of the reference signal coupled to the dividers. Similarly, any spurious signal at frequency $f_1$, introduced into the $f_2$ channel, (or, conversely, any $f_2$ frequency signal introduced into the $f_1$ channel,) which might tend to approach the threshold level, is correspondingly reduced by a proportionate increase in the amplitude of the reference signal. The overall effect is to stabilize the level of the signals applied to the threshold circuits and, thereby, to minimize possible error due to signal fading or due to spurious frequency signal components.

Amplitude Modulation

An amplitude modulated signal, E, can be described by the equation $$E = E_c (1 + m \cos \Omega t) \cos \omega t, \qquad (7)$$

where $E_c$ is the carrier peak amplitude;

$\Omega$ is the angular frequency of the modulating signal;

$m$ is the modulation coefficient;

and $\omega$ is the angular frequency of the carrier.

The output from a square law amplitude detector includes a modulation component $E_m$, given by $E_c^2/2$ $(2m)$, and a direct current component given by $$\frac{E_c}{2}\left(1+\frac{m^2}{2}\right)$$

Figure 5:
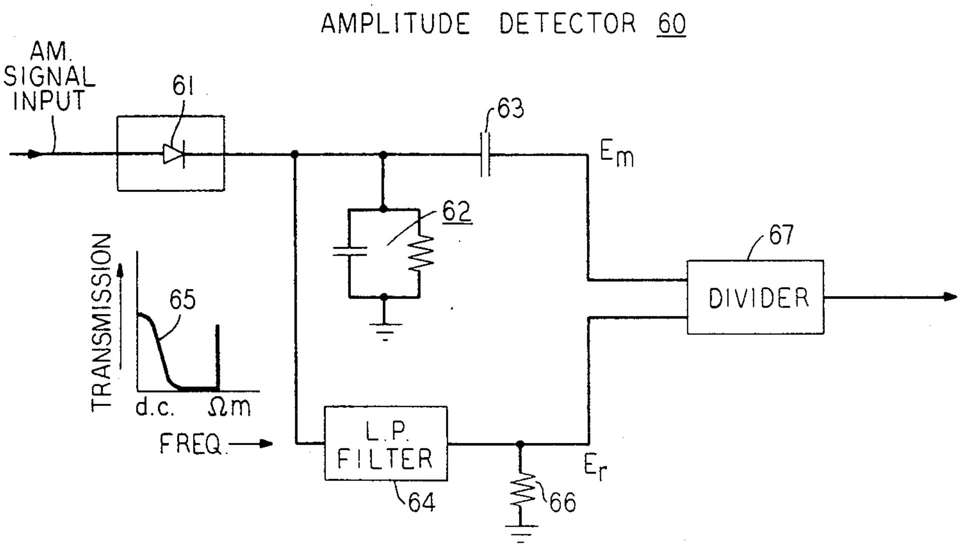
FIG. 5 shows the invention applied to an amplitude modulation detector.

. Since the maximum value of the modulation coefficient $m$, in a high quality analog system, tends to be of the order of 15 to 20 percent, the d.c. component, to within a couple of percent, is independent of changes in the depth of modulation. Changes in the carrier level $E_c$, due to signal fading or the introduction of spurious noise, and which affect the amplitude of the detected modulation component $E_m$, also produce a proportionate change in the amplitude of the direct current component. Thus, the latter can be used, in accordance with the invention, to normalize the former. This is illustrated in FIG. 5, which shows the detector portion of an amplitude modulation signal receiver comprising an amplitude detector 60, including a series-connected diode 61; a parallel R-C circuit 62 connected between the output end of diode 61 and ground; and a series, blocking capacitor 63.

Also connected directly to the output end of diode 61 is a low pass filter 64 whose transmission characteristic, as given by curve 65, cuts off below the lowest modulation frequency $\Omega_m$. Thus, the reference signal $E_r$ developed across a shunt resistor 66 connected at the output end of filter 64 is proportional to the amplitude of the direct current voltage produced at the output of detector diode 61. The reference signal $E_r$ and the modulation signal $E_m$ are both coupled to divider 67.

In operation, an amplitude modulated signal connected to the input of detector 60, produces a direct current signal component and a useful, modulation signal component. The former is isolated by filter 64 and coupled to divider 67 along with the useful component of signal. Any spurious change in the carrier signal which would tend to change the amplitude of the useful signal is countered by a corresponding change in the d.c. component. The divider output signal is thus stabilized against spurious changes in amplitude of the amplitude modulated input signal. Implicit in the various illustrative embodiments described hereinabove, is the assumption that the modulation detector output signal and the reference signal vary proportionately. As illustrated hereinabove, this is often the case. However, if they do not, shaping circuits can be included in the reference signal path to shape the reference signal, as a function of signal level, and thereby establish the necessary proportionality. That is, if the output signal from the modulation detector does not have the same relationship to the input signal as the reference signal has with respect to the input signal, the two can be conformed by means of a shaping circuit provided the amplitude response of the modulation detection is not too dependent upon frequency.

In addition, it will be noted that the error correction system described herein is a feed-forward system. That is, a reference signal is developed along with the useful signal, and the two are coupled forward to a divider circuit which is located along the direction of signal flow. This is in contrast to the typical feed-back arrangements wherein a signal is coupled back, against the direction of signal flow, to control the gain of an amplifier, as in automatic gain control circuits.

It is apparent that in a feed-forward system, the reference signal must operate in time coincidence with the signal it is attempting to correct. Since this requires that the time delay in the reference signal path be equal to the time delay in the useful signal path, it may be necessary to include a delay circuit in one or the other of these two signal paths.

Figure 6:
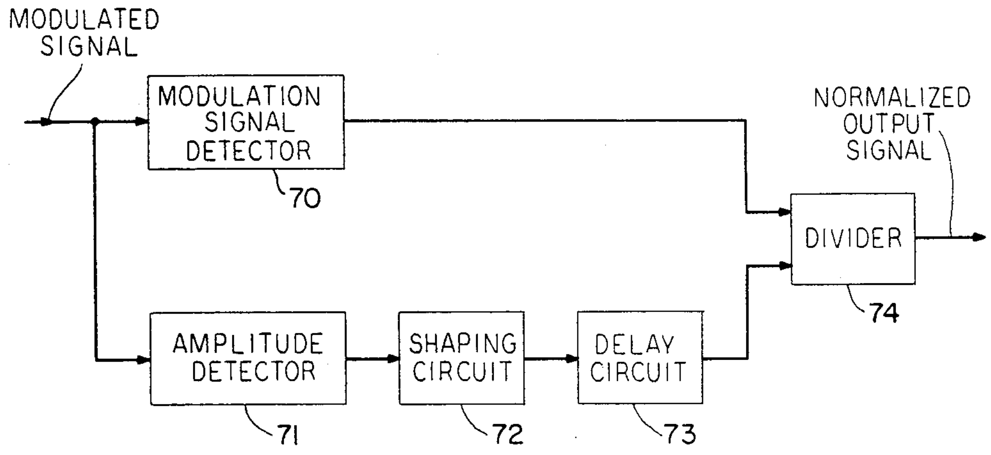
FIG. 6 shows a normalized detection system including signal shaping and delay equalization.

FIG. 6 shows, in block diagram, an error correcting circuit including signal shaping and time delay equalization. Thus, the detection system includes a modulation signal detector 70 whose output is coupled to a divider 74, forming the useful signal path. The reference signal path includes in cascade; an amplitude detector 71; a shaping circuit 72, having an input-output characteristic related to the amplitude response of modulation detector 70; and a delay circuit 73. (While shown in the reference signal path, the delay circuit can be included in either signal path, depending upon their relative time delay characteristics.)

The operation of the embodiment of FIG. 6 is, in all respects, the same as that described hereinabove in connection with the specific embodiments of FIGS. 2, 3, 4 and 5. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A modulation detection system comprising:
   - means for dividing a received modulated signal into two components;
   - means for coupling one of said components to a modulation detector;
   - means for coupling the other component to a reference generator for generating a reference signal whose amplitude varies proportionally with the amplitude of the carrier of the modulated signal component coupled to said modulation detector;
   - and means for dividing the output signal derived from said modulation detector by said reference signal.

2. A frequency-shift-keyed modulation detector comprising:
   - a signal divider for dividing a frequency-shift-keyed modulated signal into two components;
   - means for coupling one of said components to a frequency separating filter for separating signals of different frequencies;
   - separate means for amplitude detecting said different frequency signals;
   - means for coupling the other of said components to another amplitude detector to form a reference signal;
   - and means for dividing each of said detected different frequency signals by said reference signal.

3. An amplitude modulation detection circuit comprising:
   - an amplitude detector;
   - means for generating a reference signal whose amplitude varies as a function of the amplitude of the carrier signal applied to said amplitude detector comprising:
     - means for isolating the direct current component of the output signal produced by said detector;
     - and means for dividing the modulation component of signal derived from said detector by said direct current component of signal.

4. The circuit according to claim 3 wherein said detector is a diode;
   - and wherein the output from said diode is coupled to two parallel wavepaths;

filtering means in the first of said wavepaths for transmitting frequency components of wave energy greater than a specified frequency;

filtering means in the second of said wavepaths for transmitting frequency components of wave energy less than said specified frequency;

and means for dividing the transmitted components of wave energy in said first wavepath by the transmitted components of wave energy in said second wavepath.

5. The modulation detector according to claim 3 including signal shaping means in said second wavepath between said reference signal generating means and said signal divider.

6. The system according to claim 1 wherein said modulation detector is an optical phase detector;

and wherein said means for generating a reference signal is an optical amplitude detector.

7. The modulation detection system according to claim 1 wherein first and second wavepaths couple, respectively, said detector and said reference signal generating means to said dividing means;

and wherein delay equalization means are included in one of said wavepaths.

* * * * *